US010266015B2

(12) United States Patent
Osaki

(10) Patent No.: US 10,266,015 B2
(45) Date of Patent: Apr. 23, 2019

(54) PNEUMATIC TIRE

(71) Applicant: BRIDGESTONE CORPORATION, Tokyo (JP)

(72) Inventor: Kazuto Osaki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 600 days.

(21) Appl. No.: 14/761,432

(22) PCT Filed: Jan. 22, 2014

(86) PCT No.: PCT/JP2014/000311
§ 371 (c)(1),
(2) Date: Jul. 16, 2015

(87) PCT Pub. No.: WO2014/115546
PCT Pub. Date: Jul. 31, 2014

(65) Prior Publication Data
US 2015/0352908 A1 Dec. 10, 2015

(30) Foreign Application Priority Data

Jan. 22, 2013 (JP) .................. 2013-009088
Feb. 15, 2013 (JP) .................. 2013-028103

(51) Int. Cl.
*B60C 15/00* (2006.01)
*B60C 5/00* (2006.01)
(Continued)

(52) U.S. Cl.
CPC ............ *B60C 15/0009* (2013.01); *B60C 5/00* (2013.01); *B60C 15/00* (2013.01); *B60C 15/024* (2013.01);
(Continued)

(58) Field of Classification Search
CPC ... B60C 15/024; B60C 15/00; B60C 15/0009; B60C 15/02; B60C 15/04; B60C 2015/009; B60C 2015/0614; B60C 5/00
See application file for complete search history.

(56) References Cited

U.S. PATENT DOCUMENTS 5,565,047 A * 10/1996 Tanaka .................. B60C 3/04
152/454
6,345,657 B1 2/2002 Kato
(Continued)

FOREIGN PATENT DOCUMENTS

CN 101077684 A 11/2007
CN 101111397 A 1/2008
(Continued)

OTHER PUBLICATIONS

Machine translation of JP2005-193868 (no date).*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

Provided is a pneumatic tire including a carcass constituted of at least one ply including a ply main body and ply turn-up portions, and a recessed portion formed to be recessed inward in the tire axial direction at an outer surface of the tire in a region between a rim separating point and the tire maximum width position in each sidewall portion. In a section taken along the tire axial direction in a non-rim assembled state, an angle α is defined as an angle that an outer surface straight line defined by each bead back face portion passing the first intersection and the second intersection forms with respect to the tire axial direction, and the angle α is in the range from 70 to 100°.

9 Claims, 8 Drawing Sheets

(51) Int. Cl.
*B60C 15/04* (2006.01)
*B60C 15/024* (2006.01)
*B60C 15/06* (2006.01)

(52) U.S. Cl.
CPC ........ *B60C 15/04* (2013.01); *B60C 2015/009* (2013.01); *B60C 2015/0614* (2013.01); *Y10T 152/10819* (2015.01)

(56) References Cited

U.S. PATENT DOCUMENTS

| | | | |
|---|---|---|---|
| 6,530,411 | B1 | 3/2003 | Tsukagoshi et al. |
| 6,691,756 | B2 | 2/2004 | Koya et al. |
| 6,752,186 | B1 | 6/2004 | Ueyoko |
| 2010/0269968 | A1* | 10/2010 | Kurita ................ B60C 15/0027 152/454 |

FOREIGN PATENT DOCUMENTS

| | | |
|---|---|---|
| CN | 101484519 A | 7/2009 |
| EP | 0985556 A2 | 3/2000 |
| JP | 09-263113 A | 10/1997 |
| JP | 2000-158919 A | 6/2000 |
| JP | 2000-177308 A | 6/2000 |
| JP | 2000-301916 A | 10/2000 |
| JP | 2001-113920 A | 4/2001 |
| JP | 2002-337516 A | 11/2002 |
| JP | 2005-193868 A | 7/2005 |
| JP | 2010-012829 A | 1/2010 |

OTHER PUBLICATIONS

Communication dated Aug. 18, 2015 from the Japanese Patent Office in counterpart application No. 2013-9088 (Appeal No. 2014-12656).
Michelin XI2 no Cut Sample no Shashin, Tire Shop Arroba, Sep. 22, 2008, http://arroba-tire.com/223.jpg, http://arroba-tire.com/newpage2-sintyakujyoho-2009.html.
Toshiya Takahashi, Tire no Cut Model no Shashin, Impress Watch Corp., Mar. 2012, http://ad.impress.co.jp/special/bridgestone1203_2/ image12.htm, http://ad.impress.co.jp/special/bridgestone1203_2/.
Boeing 747-400 no Zenrin no Tire no Cut Model no. Shashin, May 23, 2012, http://userdisk.webry.biglobe.ne.jp/001/970/68/N000/000/003/136965847167413127684_IMG_8569.JPG, http://dreamexp-903.at.webry.info/201305/article_15.html.
JP Office Action issued in JP 2013-009088 dated Dec. 24, 2013.
JP Office Action issued in JP 2013-028103 dated Jan. 21, 2014.
JP Office Action issued in JP 2013-009088 dated Apr. 8, 2014.
JP Office Action issued in JP 2013-028103 dated Jun. 24, 2014.
JP Office Action issued in JP 2013-028103 dated Nov. 11, 2014.
JP Office Action issued in JP 2013-009088 dated Jun. 2, 2015.
International Search Report of PCT/JP2014/000311 dated Mar. 25, 2014.

* cited by examiner

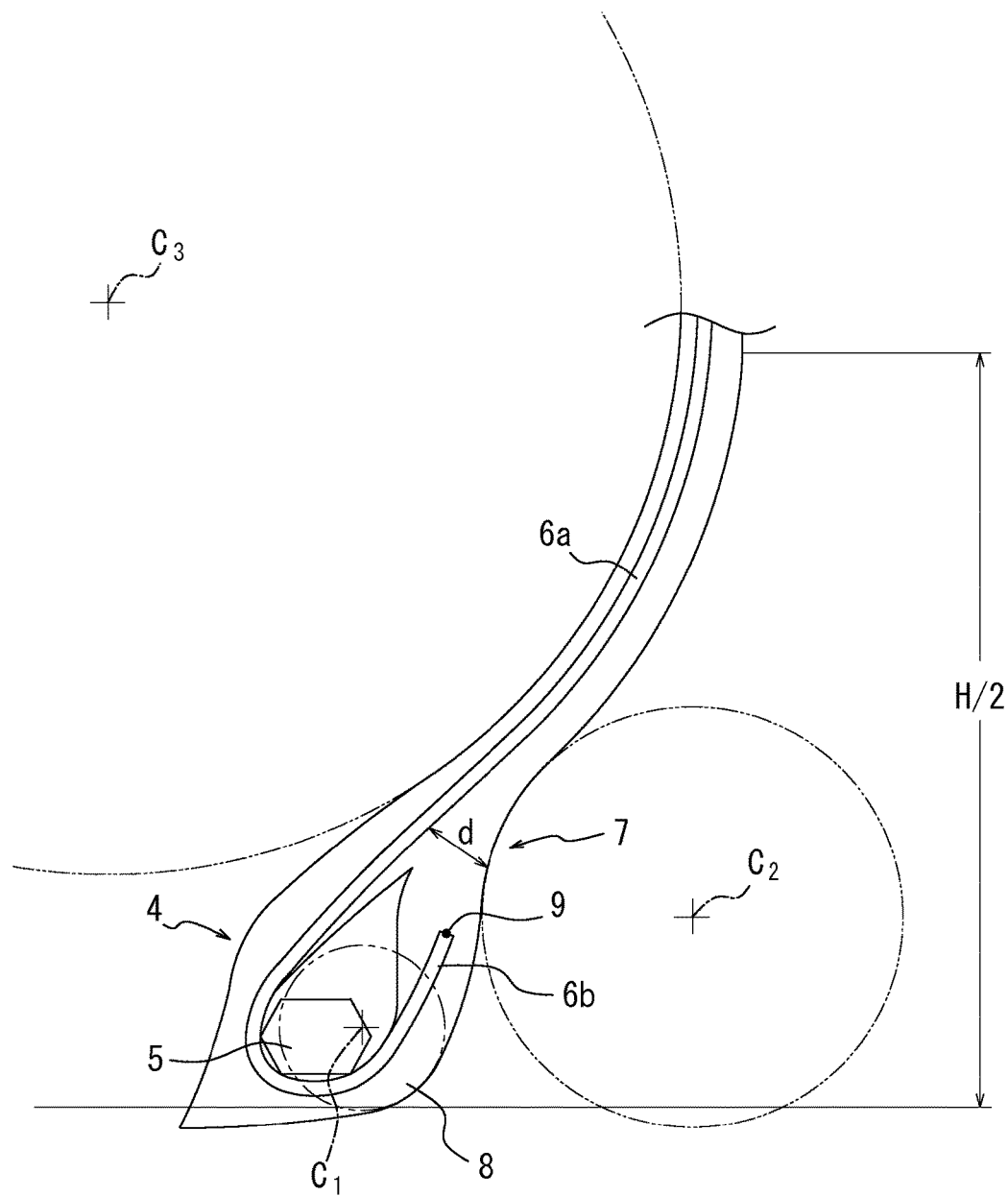

PNEUMATIC TIRE

CROSS REFERENCE TO RELATED APPLICATIONS

This is a National Stage of International Application No. PCT/JP2014/000311 filed Jan. 22, 2014, claiming priority based on Japanese Patent Application No. 2013-009088 filed Jan. 22, 2013 and Japanese Patent Application No. 2013-028103 filed Feb. 15, 2013, the contents of all of which are incorporated herein by reference in their entirety.

TECHNICAL FIELD

The present disclosure relates to a pneumatic tire.

BACKGROUND

Improving fuel consumption rates of automobiles has been targeted in recent years for achieving better environmental friendliness and economical efficiency. Under this background, reduction of rolling resistance has been pursued in tires. To this end, there have been attempts to reduce the number of components of a tire and/or weights of these components.

Reducing an amount of rubber for use in a tire is effective for reducing weight of the tire, and Patent Literature 1 proposes to form a recessed portion by thinning an outer surface of the tire inward in the tire axial direction that is located between the maximum width position of the tire and a rim separating point at which the outer surface of the tire starts to separate from a rim flange, to reduce an amount of rubber for use by the volume of the recessed portion in side rubber located in the vicinity of a bead portion (where a relatively large amount of rubber is needed) and thus, to reduce the whole weight of the tire accordingly.

CITATION LIST

Patent Literature

PTL1: JP2000158919A

SUMMARY

However, forming the recessed portion in the outer surface of the tire in the vicinity of the bead portion decreases rigidity of the tire because the thickness of the side rubber is reduced. Accordingly, when the tire is pressed against and assembled with a rim, a reactive force from the rim flange acts to deform the bead portion. The deformation of the bead portion in turn might cause an adverse effect of distorting an end of a carcass ply, possibly resulting in a separation of the ply end.

Accordingly, as described above, there has been a need for simultaneously achieving both enjoying a benefit of weight reduction of the tire as described above and maintaining highly satisfactory durability of the tire without causing the separation of the ply end.

In view of this, the present disclosure is to provide a pneumatic tire having reduced weight and simultaneously ensuring excellent durability.

The present inventor has conducted earnest studies to satisfy the need and found that, even when the recessed portion is formed in the side rubber in the vicinity of the bead portion, the adverse effect, caused by the deformation of the bead portion, on the end portion of the carcass ply is reduced by regulating the shape of the outer surface of the tire that is located in the bead portion, thereby completing the a pneumatic tire according to the disclosed aspect.

In detail, according to the disclosed aspect, provided is (1) A pneumatic tire, including: a tread portion, a pair of sidewall portions and a pair of bead portions formed to be continuous with each other; a carcass constituted of at least one ply including a ply main body provided to extend in a toroidal shape across a pair of bead cores respectively embedded in the bead portions and respective ply turn-up portions each extending from the ply main body to be turned up around the corresponding bead core from an inner side toward an outer side in a tire axial direction; and a recessed portion formed to be recessed inward in the tire axial direction at an outer surface of the tire in a region between a rim separating point and a tire maximum width position in each sidewall portion, wherein:

in a section taken along the tire axial direction in a non-rim assembled state where the tire has not been assembled with a rim and where a width between the pair of bead portions is set to be a nominal rim width, an angle $\alpha$ is defined as an angle that an outer-surface straight line, defined by a bead back face portion and passing a first intersection and a second intersection, forms with respect to the tire axial direction; the first intersection being defined as an intersection between a straight line passing a barycenter of the bead core and extending in parallel with the tire axial direction, and the outer surface of the tire; the second intersection being defined as an intersection between a straight line passing a point located outward in a tire radial direction at a distance of 50% of a maximum width of the bead core in the tire radial direction from an outermost end of the bead core in the tire radial direction and extending in parallel with the tire axial direction, and the outer surface of the tire; the angle $\alpha$ being in the range from 70 to 100°.

Herein, a "rim separating point" represents a point at which the outer surface of the tire is released from contact with the rim flange in a state where the tire has been assembled with a prescribed rim and inflated at the normal maximum internal pressure in accordance with size of the tire with no load exerted thereon. A "prescribed rim" represents a standard rim prescribed for each tire size by an industrial standard which is valid in an area where the tire is manufactured and used. Examples of the industrial standard include: JATMA (The Japan Automobile Tire Manufacturers Association Inc.) YEAR BOOK in Japan; ETRTO (European Tire and Rim Technical Organization) STANDARD MANUAL in Europe; TRA (The Tire and Rim Association Inc.) YEAR BOOK in the United States and the like. A "normal maximum internal pressure" represents an air pressure associated with the maximum load capability of a single tire in an applicable size and ply rating specified in the JATMA or the like. The phrase "a width between the pair of bead portions is set to be a nominal rim width" represents that a distance in the tire axial direction between respective bead heel portions in the pair of bead portions is set to be a rim width (i.e., a rim width suitable for bringing out the performance of the tire) specified in the JATMA or the like.

The above structure makes it possible to isolate an end portion of the ply turn-up portion of the carcass from a region subject to the reactive force from the rim flange to reduce a load applied to the end portion of the ply turn-up portion. As a result, the benefit of weight reduction of the tire by forming the recessed portion in the side rubber is enjoyed, and at the same time, excellent durability of the tire is maintained.

(2) In the pneumatic tire according to a preferred embodiment, in the non-rim assembled state, the outer surface of the tire in a region between a bead heel portion and the tire maximum width position is defined by at least one arc having a center of curvature that is located inward of the outer surface of the tire in the tire axial direction, at least one arc having a center of curvature that is located outward of the outer surface of the tire in the tire axial direction, and at least one arc having a center of curvature that is located inward of the outer surface of the tire in the tire axial direction in the stated order in a direction toward an outer side in the tire radial direction.

The above structure helps reduce the weight of the tire by reducing an amount of the side rubber. Furthermore, by bringing the bead portion in the vicinity of the bead heel portion into sufficient contact with the rim flange, the reactive force from the rim flange is dispersed throughout the bead portion. As a result, load concentration on the end portion of the ply turn-up portion of the carcass is prevented, and even better durability of the tire is maintained.

(3) In the pneumatic tire according to a preferred embodiment, in the non-rim assembled state, a rubber thickness gradually decreases toward the outer side in the tire radial direction in at least a portion of a region of the tire defined in the tire radial direction and including the recessed portion, and the rubber thickness remains constant in a region of the tire that follows the at least a portion of the region of the tire defined in the tire radial direction and including the recessed portion and that extends outward in the tire radial direction to one-half a tire section height in the tire radial direction.

Note that a "rubber thickness" represents the shortest distance of rubber measured from a cord surface of a member in the tire to the outer surface of the tire. A "cord surface" of a member represents a cord surface that is located closest to the outer surface of the tire in various members, such as a carcass and a chafer, which are present in each region. The phrase "a rubber thickness that remains constant" represents that the maximum rubber thickness and the minimum thickness in the region are in the range of ±10% of the average rubber thickness.

The above structure makes it possible to prevent strain concentration on the end portion of the ply turn-up portion of the carcass by securing the rubber thickness in the vicinity of the bead portion and, at the same time, to further facilitate weight reduction of the tire satisfactorily by reducing the rubber thickness in the region located outward of the bead portion in the tire radial direction.

(4) In the pneumatic tire according to a preferred embodiment, in the non-rim assembled state, an angle β is defined as an angle that a tilt line, defined by a ply turn-up portion, passing a third intersection and a fourth intersection forms with respect to the tire axial direction, the third intersection being defined as an intersection between a straight line passing the barycenter of the bead core and extending in parallel with the tire axial direction and the ply turn-up portion, the fourth intersection being defined as an intersection between the straight line passing the point located outward in the tire radial direction at the distance of 50% of the maximum width of the bead core in the tire radial direction from the outermost end of the bead core in the tire radial direction and extending in parallel with the tire axial direction and the ply turn-up portion, the angle β being in the range from 70 to 100°.

By thus regulating the angle of the ply turn-up portion, the end portion of the ply turn-up portion is isolated from the region that is deformed by the rim flange. As a result, the occurrence of strain in the end portion is prevented. Furthermore, since load intensity on the end portion of the turn-up portion is further reduced by further isolating the end portion of the ply turn-up portion of the carcass from the region subject to the reactive force from the rim flange, the result is improvement in terms of both enjoying the benefit of weight reduction of the tire by forming the recess portion in the side rubber and securing excellent durability of the tire satisfactorily.

(5) In the pneumatic tire according to a preferred embodiment, in a rim assembled state where the tire has been assembled with a prescribed rim and inflated at a normal maximum internal pressure with no load exerted thereon, a clearance distance defined in the tire axial direction between the outer surface of the tire and a rim flange gradually increases toward an outer side in the tire radial direction, and a maximum length of the clearance distance is in the range from 10 to 30% of a maximum width of the bead core in the tire axial direction.

A "maximum clearance distance" represents a distance defined in the tire axial direction from a flange end to a point of contact between a line passing the flange end and drawn in parallel with the tire axial direction and the outer surface of the tire.

With the above structure, a contact zone between the tire and the rim flange is located further inward in the tire radial direction compared with a conventional structure. Accordingly, the adverse effect, caused by the deformation of rubber used in the bead portion, on the end portion of the ply turn-up portion is reduced, and the occurrence of the separation of the ply end is further prevented.

(6) In the pneumatic tire according to a preferred embodiment, in the non-rim assembled state, a rubber thickness measured in the tire axial direction on a straight line passing the barycenter of the bead core and drawn in parallel with the tire axial direction is in the range from 70 to 300% of a rubber thickness measured in the tire radial direction on a straight line passing the barycenter of the bead core and drawn in parallel with the tire radial direction.

The above structure allows the reactive force from the rim flange to be received evenly by the entire rubber in the vicinity of the bead heel portion when the tire is assembled with a rim. As a result, the adverse effect on the end portion of the ply turn-up portion is reduced, and the occurrence of the separation of the ply end is further prevented.

(7) In the pneumatic tire according to a preferred embodiment, in the non-rim assembled state, a bead base width of the bead portion is in the range from 200 to 260% of a maximum width of the bead core in the tire axial direction.

A "bead base width" represents a length from a bead toe of the bead portion to an intersection between a tangent line of a bead base portion and the outer-surface straight line defined by the bead back face portion.

The above structure allows the bead base portion to establish contact with a bead seat portion over a sufficient area when the tire is assembled with a rim. Accordingly, the reactive force from the rim flange is satisfactorily absorbed by rubber used in the vicinity of the bead base portion. As a result, the adverse effect on the end portion of the ply turn-up portion is reduced, and the occurrence of the separation of the ply end is further prevented. A "bead seat portion" herein represents a portion of the bead seat defined in the tire axial direction from an intersection between a tangent line of the bead back face portion at the rim separating point and an extension line of the bead seat portion to a hump.

(8) In the pneumatic tire according to a preferred embodiment, in the non-rim assembled state, a distance defined in the tire radial direction from an intersection between the outer-surface straight line defined by the bead back face portion and a tangent line of a bead base portion of the bead portion to an end portion of the ply turn-up portion is in the range from 100 to 225% of a maximum width of the bead core in the tire axial direction.

The above structure makes it possible to reduce the weight of the tire by shortening the carcass ply.

(9) In the pneumatic tire according to the preferred embodiment (8), in the non-rim assembled state, the distance defined in the tire radial direction from the intersection between the outer-surface straight line defined by the bead back face portion and the tangent line of the bead base portion of the bead portion to the end portion of the ply turn-up portion may be in the range from 135 to 200% of the maximum width of the bead core in the tire axial direction.

The above structure makes it possible to reduce the weight of the tires by shortening the carcass ply.

Thus, the present disclosure provides a pneumatic tire that is capable of achieving weight reduction of the tire and is also capable of maintaining durability of the tire at the same time.

BRIEF DESCRIPTION OF THE DRAWING

In the accompanying drawings:

FIG. 4 is another enlarged view of the bead portion and the sidewall portion on the one side of the pneumatic tire illustrated in FIG. 1;

DETAILED DESCRIPTION

The following describes a pneumatic tire according to an embodiment in detail with reference to the drawings.

Figure 1:
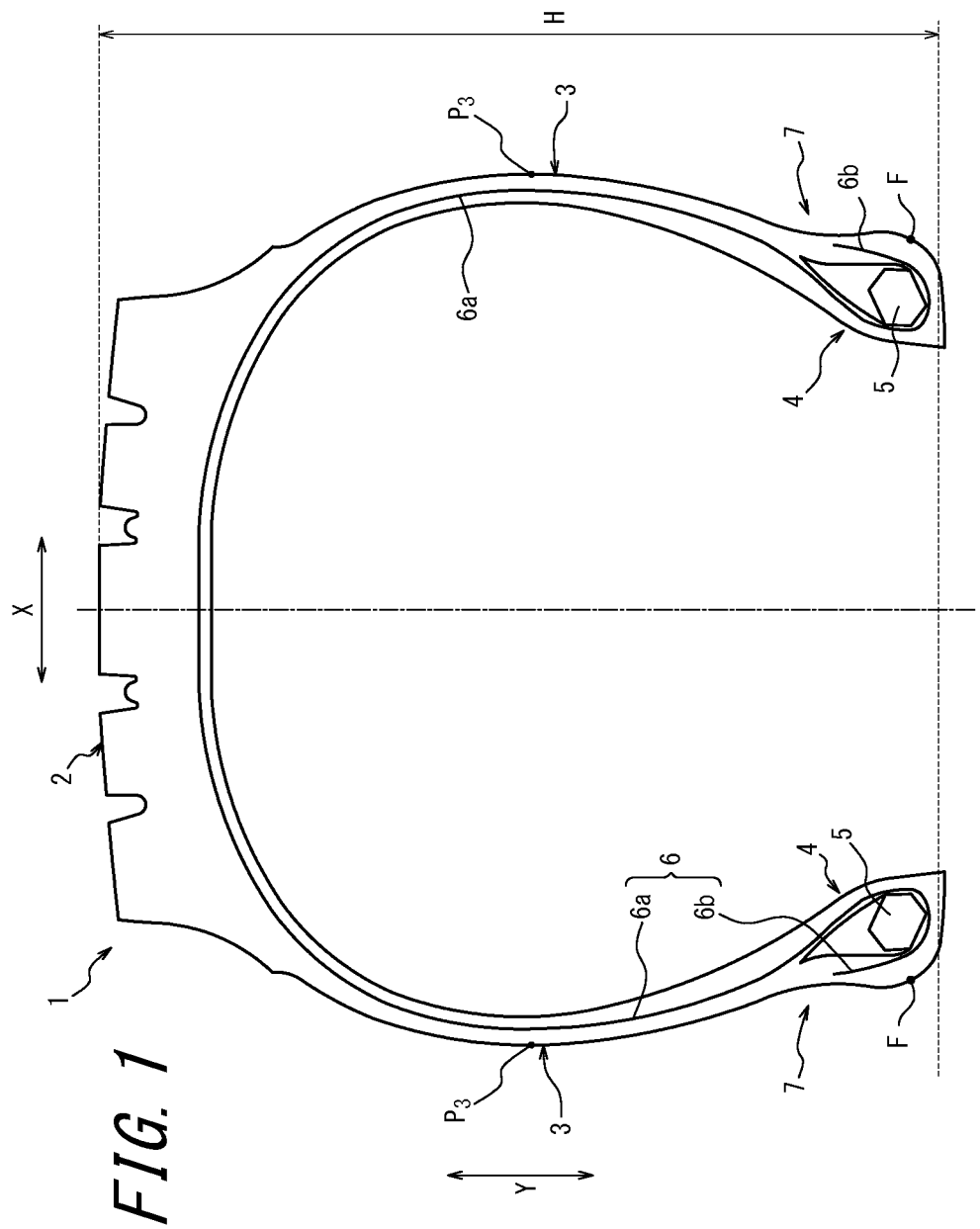
FIG. 1 is a sectional view of a pneumatic tire according to an embodiment taken along the tire axial direction in a non-rim assembled state.

FIG. 1 is a sectional view of a pneumatic tire (hereinafter, referred to as a "tire") according to an embodiment taken along the tire axial direction in a state (hereinafter, referred to as a "non-rim assembled state") where the tire has not yet been assembled with a rim and where a width between a pair of bead portions is set to be a nominal rim width.

A tire 1 includes a tread portion 2, a pair of sidewall portions 3, 3, and a pair of bead portions 4, 4. The tire 1 also includes a carcass 6 constituted of at least one ply including a ply main body 6a provided to extend in a toroidal shape across a pair of bead cores 5, 5 respectively embedded in the bead portions 4, 4 and respective ply turn-up portions 6b each extending from the ply main body 6a to be turned up around the corresponding bead core 5 from the inner side toward the outer side in a tire axial direction.

The ply turn-up portion 6b extends around the bead core 5 and turned up along the bead core 5 without being wound back over an outer surface of the bead core 5, and then extends outward in the tire radial direction substantially in parallel with the ply main body 6a in the present embodiment.

The tire 1 also includes a recessed portion 7 formed to be recessed inward in the tire axial direction at an outer surface of the tire in a region defined in the tire radial direction between a rim separating point F and the tire maximum width position $P_3$ in each sidewall portion 3.

In FIG. 1, the tire axial direction refers to a direction represented by an arrow X, and the tire radial direction refers to a direction represented by an arrow Y. The tire maximum width position $P_3$ in the sidewall portion 3 refers to the outermost end of the sidewall portion 3 in the tire axial direction.

The recessed portion 7 is formed at the outer surface of the tire defined in the tire radial direction in at least a portion (in the vicinity of the bead portion 4, in the present embodiment) of the region between the rim separating point F and the tire maximum width position $P_3$ such that the entire recessed portion 7 is included in the region. The recessed portion 7 is formed by thinning the outer surface to be recessed inward in the tire axial direction.

By forming the recessed portion 7 in the region of the side rubber between the rim separating point F and the tire maximum width position $P_3$, the weight of the tire is reduced because an amount of rubber material is reduced by the volume of the recessed portion 7, and this in turn reduces rolling resistance of the tire.

Figure 2:
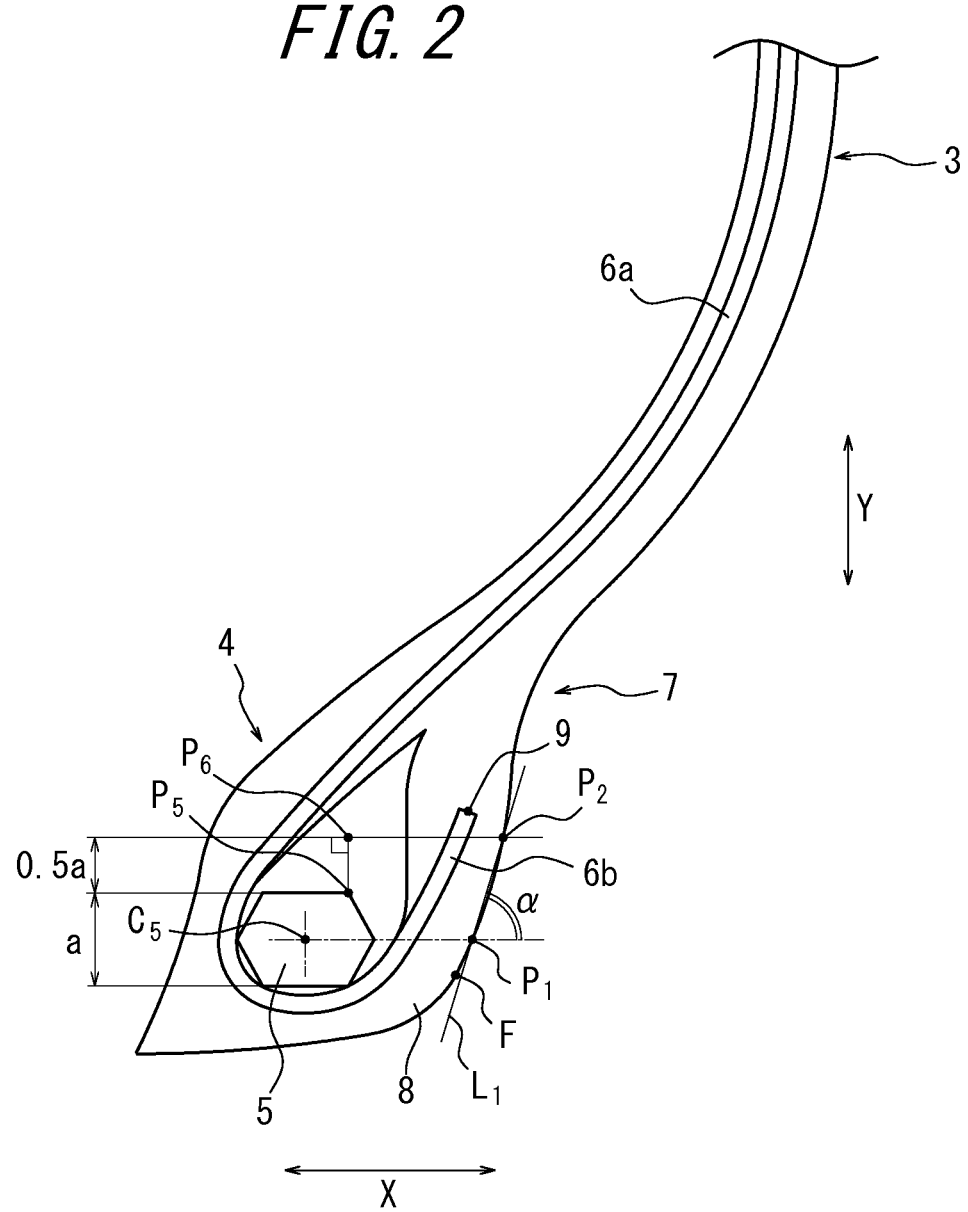
FIG. 2 is an enlarged view of a bead portion and a sidewall portion on one side of the pneumatic tire illustrated in FIG. 1.

Next, reference is made to FIG. 2 which is an enlarged view of the bead portion 4 and the sidewall portion 3 which are located on one side of FIG. 1.

In the illustrated embodiment, it is preferable, in addition to the aforementioned structure, that an angle α is in the range from 70 to 100° in a state where a width between the pair of bead portions 4, 4 is set to be a nominal rim width in the section taken along the tire axial direction as illustrate in FIG. 2. The angle α is defined as an angle that an outer-surface straight line $L_1$, defined by a bead back face portion and passing the first intersection $P_1$ and the second intersection $P_2$, forms with respect to the tire axial direction X. The first intersection $P_1$ is defined as an intersection between a straight line passing a barycenter $C_5$ of the bead core 5 and extending in parallel with the tire axial direction, and the outer surface of the tire. The second intersection $P_2$ is defined as an intersection between a straight line passing any point $P_6$ located outward in a tire radial direction at a distance of 50% of a maximum width a of the bead core 5 in the tire radial direction from an outermost end $P_5$ of the bead core 5 in the tire radial direction and extending in parallel with the tire axial direction, and the outer surface of the tire.

Herein, the barycenter $C_5$ of the bead core 5 in the present embodiment refers to a barycenter of the sectional shape itself, rather than an actual barycenter taking weight into consideration. Furthermore, the state where the width between the pair of bead portions is set to be the nominal rim width means that a distance defined in the widthwise direction between the respective bead heels 8, 8 of the bead portions 4, 4 of the tire 1 is set to be a rim width (i.e., a rim width suitable for bringing out the performance of the tire) specified in the JATMA or the like, and the angle α is represented by a value measured in this state. The angle α refers to an angle that the outer surface straight line $L_1$ of the bead back face portion forms with respect to the tire axial direction X on the outer side in the tire axial direction than the outer surface straight line $L_1$ of the bead back face portion and that is located on the outer side in the tire radial direction than the straight line passing the first intersection $P_1$ and extending in parallel with the tire axial direction.

Figure 3A:
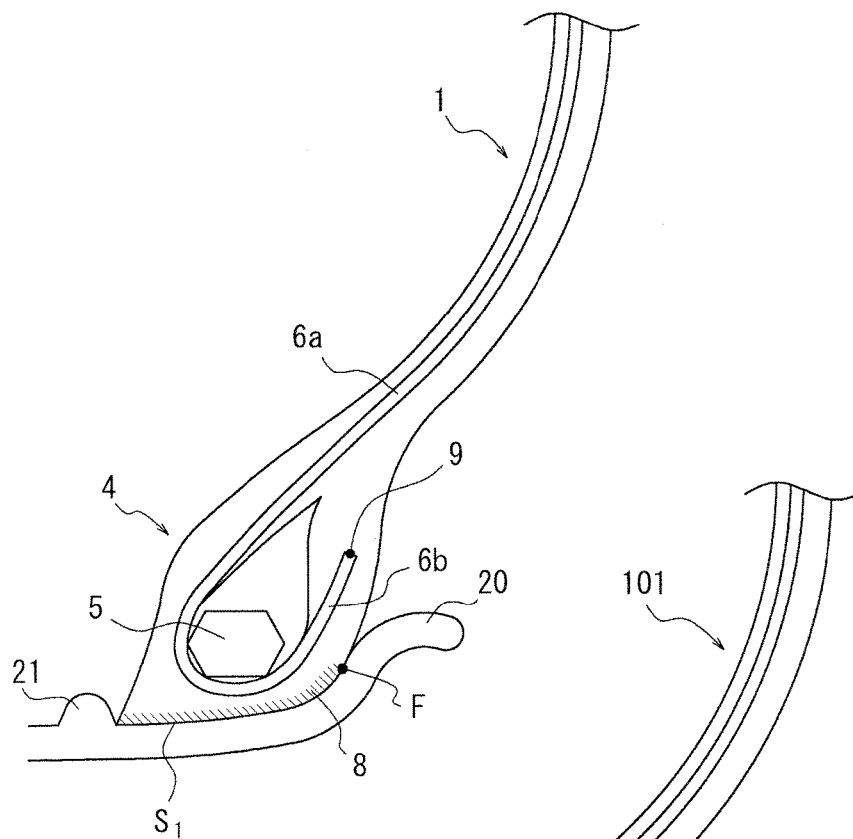
FIG. 3A illustrates a state of contact between a bead portion and a rim flange in a state where a pneumatic tire according to an embodiment has been assembled with a prescribed rim and inflated at the normal maximum internal pressure with a specified load exerted thereon.

FIG. 3A illustrates a state of contact between the bead portion 4 and the rim flange 20 when the angle α that the outer surface straight line $L_1$ of the bead back face portion forms with respect to the tire axial direction X is 80° in a state where the pneumatic tire 1 according to an embodiment has been assembled with a prescribed rim and inflated at the normal maximum internal pressure with a specified load exerted thereon. On the other hand, FIG. 3B illustrates a state of contact between a bead portion 40 and a rim flange 200 when the angle α that the outer surface straight line $L_1$ of the bead back face portion forms with respect to the tire axial direction X is 60° in a state where a conventional pneumatic tire 101 has been assembled with a prescribed rim and inflated at the normal maximum internal pressure with a specified load exerted thereon.

As described earlier, although weight reduction of the tire may be achieved by forming the recessed portion in the side rubber in the region defined in the tire radial direction between the rim separating point and the tire maximum width position, rigidity of the bead portion is reduced because of the reduced thickness of the side rubber. Accordingly, when the tire is assembled with a rim, rubber used in the bead portion tends to be deformed as the tire is pressed against the rim and receives the reactive force from the rim flange.

Figure 3B:
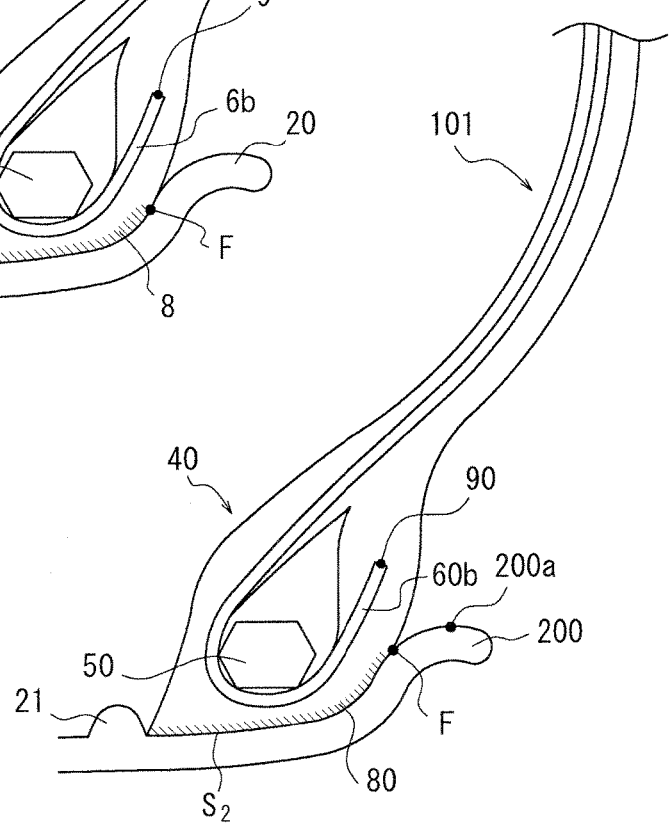
FIG. 3B illustrates a state of contact between a bead portion and a rim flange in a state where a conventional pneumatic tire has been assembled with a prescribed rim and inflated at the normal maximum internal pressure with a specified load exerted thereon.

Firstly, in the conventional pneumatic tire 101 as illustrated in FIG. 3B in the state where the tire has been assembled with a rim and inflated at the normal maximum internal pressure with a specified load exerted thereon, a contact zone $S_2$ (corresponding to a hatched zone) between the bead portion 40 and the rim flange 200 extends from a bead heel portion 80 to the vicinity of a rim flange end 200a. As illustrated, an end portion 90 of the ply turn-up portion 60b is located near the contact zone $S_2$ and therefore is subject to the effect of the reactive force from the rim flange 200. Accordingly, when the bead portion 40 is deformed, the end portion 90 might be strained, leading to the occurrence of the separation of the ply end.

On the other hand, in the pneumatic tire 1 according to the present embodiment as illustrated in FIG. 3A, the rising angle α of a portion of the outer surface of the tire that is located outward of a bead heel portion 8 in the tire radial direction, that is to say, the outer surface of the bead back face portion, is increased compared with that in the conventional pneumatic tire 101. This allows a contact zone $S_1$ (corresponding to a hatched zone) between the bead portion 4 and the rim flange 20 to be located further inward in the tire radial direction, i.e., closer to the bead heel 8, than the conventional contact zone $S_2$. As a result, an end portion 9 of the ply turn-up portion 6b is isolated from the contact zone $S_1$, and the effect of the reactive force from the rim flange 20 on the end portion 9 is significantly mitigated compared with the conventional structure, resulting in a pneumatic tire with excellent durability that will not suffer from the occurrence of the separation of the ply end.

With the structure according to the present embodiment in which the outer surface of the tire defined by the bead back face portion is designed to form the angle α in the range from 70 to 100°, the effect of the rim flange 20 on the end portion 9 of the ply turn-up portion 6b is minimized even in the state where the tire has been assembled with a rim and inflated at the normal maximum internal pressure with a specified load exerted thereon, resulting in a pneumatic tire which maintains sufficient durability.

Herein, the angle α is set in the range from 70 to 100° because setting the angle to be 70° or more allows the end portion 9 of the turn-up portion 6b to be isolated from the rim flange 20 sufficiently to prevent the occurrence of strain in the end portion 9. On the other hand, setting the angle to be 100° or less allows the end portion 9 to be isolated from the ply main body 6a to prevent the occurrence of strain caused by deformation of the ply main body 6a.

Additionally, the angle α that the outer surface straight line $L_1$ of the bead back face portion forms with respect to the tire axial direction X is more preferably in the range from 80 to 90°. Setting the angle to be 80° or more allows the end portion 9 of the turn-up portion 6b to be isolated from the rim flange 20 sufficiently to further prevent the occurrence of strain in the end portion 9. On the other hand, setting the angle to be 90° or less allows the end portion 9 to be isolated from the ply main body 6a to further prevent the occurrence of strain caused by deformation of the ply main body 6a.

As illustrated in FIG. 4, it is preferable in a pneumatic tire according an embodiment in the non-rim assembled state that the outer surface of the tire in a region between the bead heel portion 8 and the tire maximum width position $P_3$ is defined by at least one arc having a center of curvature $C_1$ that is located inward of the outer surface of the tire in the tire axial direction, at least one arc having a center of curvature $C_2$ that is located outward of the outer surface of the tire in the tire axial direction, and at least one arc having a center of curvature $C_3$ that is located inward of the outer surface of the tire in the tire axial direction in the stated order in a direction toward the outer side in the tire radial direction.

By thus forming a portion of the outer surface of the tire corresponding to the bead heel portion 8 to have a convex shape toward the outer side of the tire, the bead portion 4 in the vicinity of the bead heel portion 8 and the rim flange 20 are brought into sufficient contact over the entire contact zone $S_1$, and the reactive force from the rim flange 20 is dispersed throughout the contact zone $S_1$. As a result, load intensity on the end portion 9 of the ply turn-up portion 6b of the carcass is reduced, and the occurrence of the separation of the ply end is prevented.

Furthermore, by forming a portion of the outer surface of the tire corresponding to a portion of the side rubber to have a convex shape toward the inner side of the tire, an amount of rubber is reduced, and the weight of the tire is reduced.

Although FIG. 4 illustrates only the three arcs having the center of curvature $C_1$, $C_2$, and $C_3$, the outer surface of the tire located between the arc having the center of curvature $C_1$ and the center of curvature $C_2$ also includes portions formed by several other arcs having different centers of curvature such that these portions are seamlessly connected.

Furthermore, the recessed portion 7 does not need to be formed by the single arc as illustrated in FIG. 4 and may be, for example, defined by a plurality of arcs. Moreover, the center of curvature and the radius of curvature defining the shape of the outer surface of the tire are not limited to the examples illustrated in FIG. 4.

As illustrated in FIG. 4, it is also preferable, in the non-rim assembled state, that a rubber thickness d gradually decreases toward the outer side in the tire radial direction in at least a portion of a region of the tire defined in the tire radial direction and including the recessed portion 7, and that the rubber thickness d remains constant in a region of the tire that follows the at least a portion of the region of the tire defined in the tire radial direction and including the recessed portion and that extends outward in the tire radial direction to one-half a tire section height H in the tire radial direction.

Herein, the rubber thickness d refers to the shortest distance of rubber from a cord surface that is located closest to the outer surface of the tire in various members, such as a carcass and a chafer, which are present in the region. The tire section height H refers to a distance in the tire radial direction between the bead heel portion 8 and the outer most end of the tire in the tire radial direction. The rubber thickness that remains constant means that the maximum rubber thickness and the minimum thickness are in the range of ±10% of the average rubber thickness in the region of the tire extending from an end of the at least a portion of the region with the gradually decreased rubber thickness to one-half the tire section height H.

By thus ensuring that the rubber thickness is relatively large in the vicinity of the bead portion 4, strain concentration on the end portion 9 of the ply turn-up portion 6b of the carcass caused by the reactive force from the rim flange 20 is prevented. Furthermore, by gradually decreasing the rubber thickness and alleviating differences in rubber thickness in the region, local deformation of the bead portion is prevented, and moreover, the region with a predetermined rubber thickness required to ensure the performance such as rigidity, durability, and steering stability is able to receive force applied toward the outer side in the tire axial direction evenly when the tire has been inflated with air.

Figure 5:
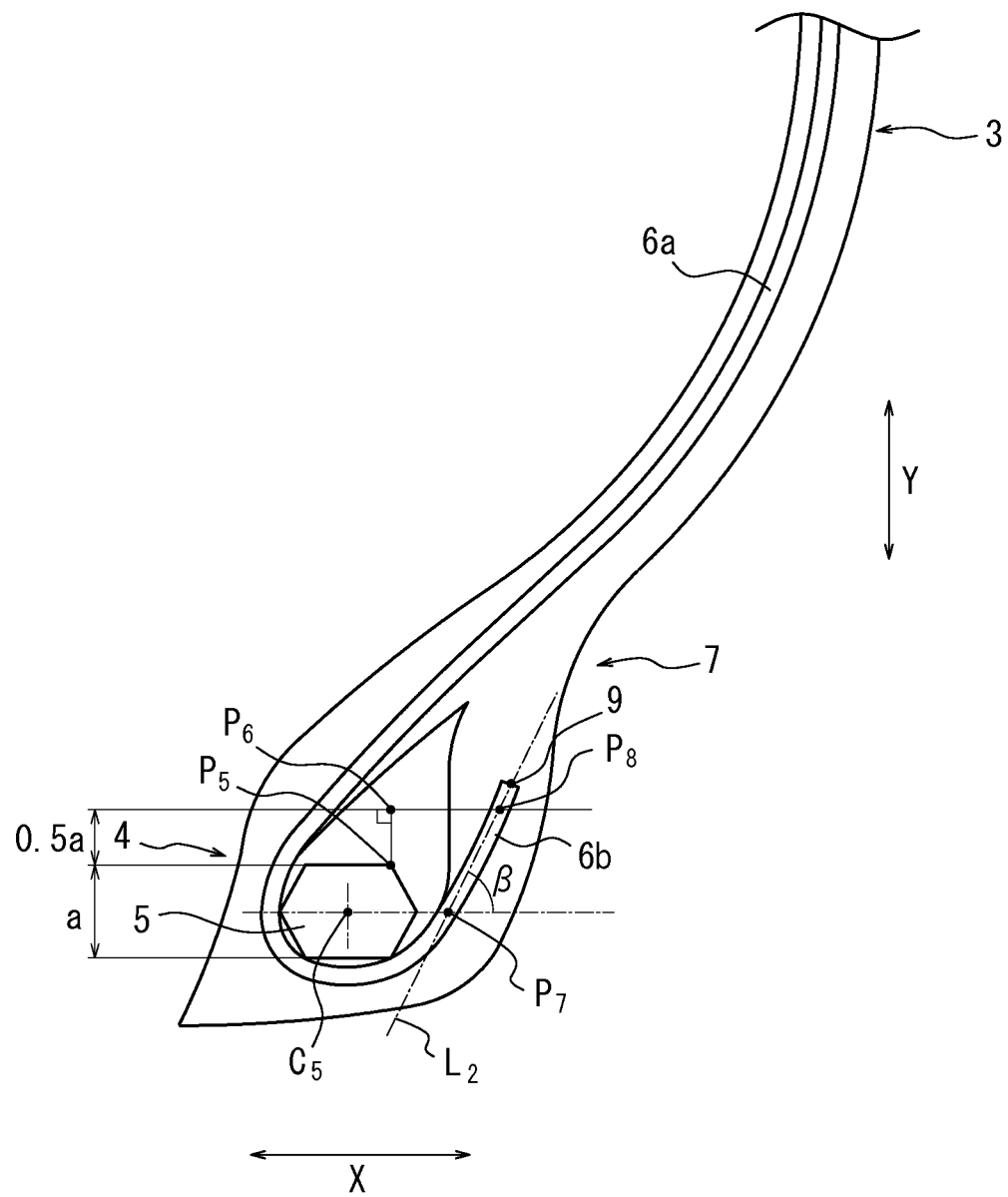
FIG. 5 is yet another enlarged view of the bead portion and the sidewall portion on the one side of the pneumatic tire illustrated in FIG. 1.

As illustrated in FIG. 5, it is also preferable that an angle β is in the range from 70 to 100°. The angle β is defined as an angle that a tilt line $L_2$, defined by the ply turn-up portion 6b, passing the third intersection $P_7$ and the fourth intersection $P_8$ forms with respect to the tire axial direction. The third intersection $P_7$ is defined as an intersection between a straight line passing the barycenter $C_5$ of the bead core 5 and extending in parallel with the tire axial direction and the ply turn-up portion 6b. The fourth intersection $P_8$ is defined as an intersection between the straight line passing any point $P_6$ located outward in the tire radial direction at the distance of 50% of the maximum width a of the bead core 5 in the tire radial direction from the outermost end $P_5$ of the bead core 5 in the tire radial direction and extending in parallel with the tire axial direction and the ply turn-up portion 6b.

The angle β refers to an angle that the tilt line $L_2$ of the ply turn-up portion forms with respect to the tire axial direction X on the outer side in the tire axial direction than the tilt line $L_2$ of the ply turn-up portion and that is located on the outer side in the tire radial direction than the straight line passing the third intersection $P_7$ and extending in parallel with the tire axial direction.

By thus regulating the angle of the ply turn-up portion 6b, the end portion 9 of the ply turn-up portion 6b is isolated from the rim flange 20. As a result, the occurrence of strain in the end portion 9 is prevented Furthermore, since load intensity on the end portion of the turn-up portion is further reduced by further isolating the end portion of the ply turn-up portion of the carcass from the region subject to the reactive force from the rim flange, the result is improvement in terms of both enjoying the benefit of weight reduction of the tire by forming the recess portion in the side rubber and securing excellent durability of the tire satisfactorily.

The angle β is set to be 70° or more because the angle of 70° or more allows the end portion 9 to be isolated from the rim flange 20 sufficiently to prevent the occurrence of strain in the end portion 9. On the other hand, the angle β is set to be 100° or less because the angle of more than 100° might pose the end portion 9 at the risk of contacting the bead core 5 and because the turn-up portion 6b, when configured to be wound back over the bead core 5, might require an increased manufacturing cost. When the angle β is set to be more than 110°, the end portion 9 is located too close to the ply main body 6a, leading to an increase in strain of the ply turn-up portion 6b attributed to deformation of the ply main body 6a.

Figure 6:
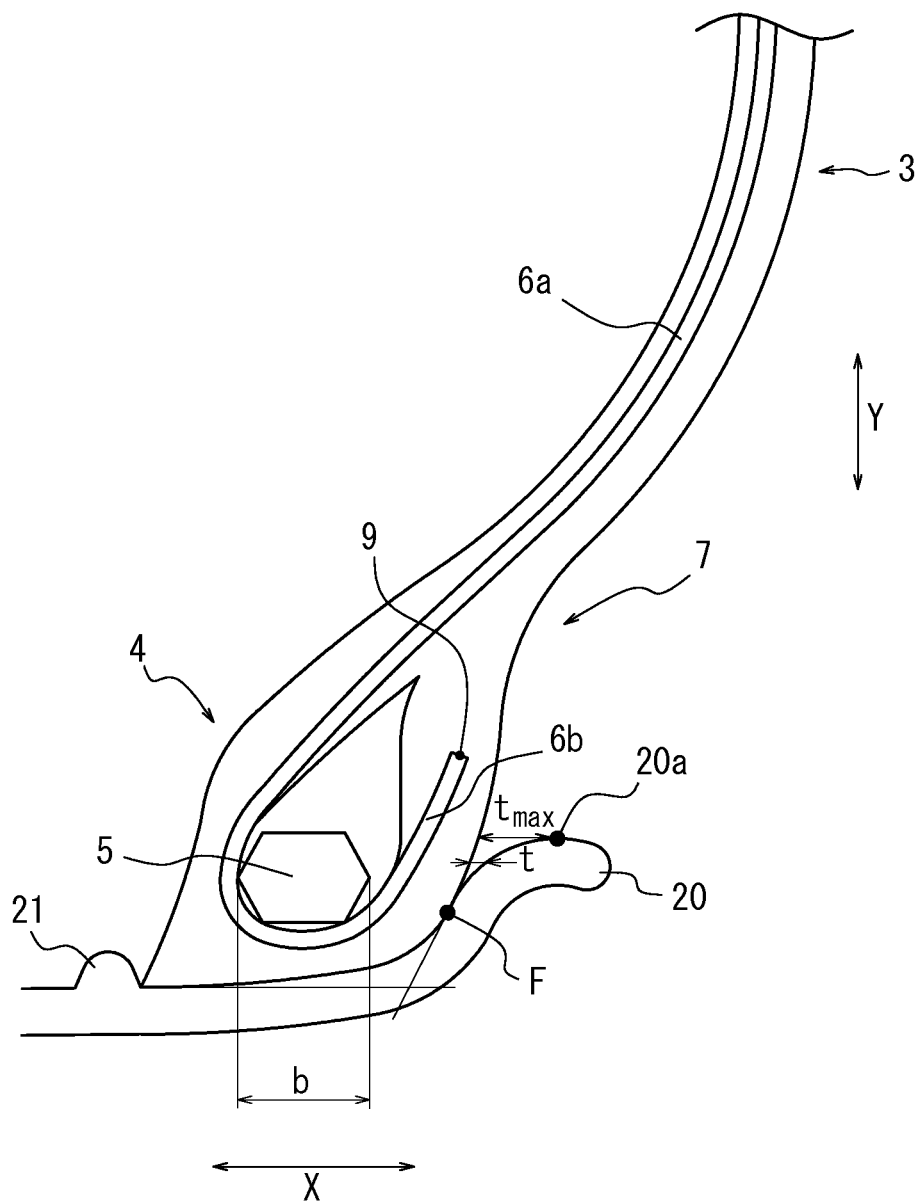
FIG. 6 is a sectional view of a pneumatic tire according to an embodiment taken along the tire axial direction in a state where the pneumatic tire according to the embodiment has been assembled with a prescribed rim and inflated at the normal maximum internal pressure with no load exerted thereon.

As illustrated in FIG. 6, it is also preferable that, in a rim assembled state where the tire has been assembled with a prescribed rim and inflated at a normal maximum internal pressure with no load exerted thereon, a clearance distance t defined in the tire axial direction between the outer surface of the tire and the rim flange 20 gradually increases toward the outer side in the tire radial direction, and that the maximum length $t_{max}$ of the clearance distance t is in the range from 10 to 30% of the maximum width b of the bead core 5 in the tire axial direction.

The clearance distance t refers to the shortest distance in the tire axial direction between the outer surface of the tire and the innermost end of the rim flange 20 in the tire axial direction, and the maximum length $t_{max}$ of the clearance distance t is, as described earlier, the distance defined in the tire axial direction from the flange end to a point of contact between a straight line passing the flange end and drawn in parallel with the tire axial direction and the outer surface of the tire. The maximum width b of the bead core 5 in the tire axial direction refers to a distance between a line passing the innermost end of the bead core 5 in the tire axial direction and extending in parallel with the tire radial direction and a line passing the outermost end of the bead core 5 in the tire axial direction and extending in parallel with the tire radial direction.

With the above structure, the contact zone between the tire and the rim flange is located further inward in the tire radial direction compared with a conventional structure. Accordingly, even when the reactive force from the rim flange deforms rubber used in the bead portion, the effect on the end portion 9 of the ply turn-up portion 6b is reduced, and the occurrence of the separation of the ply end is further prevented.

The maximum length $t_{max}$ of the clearance distance t is set to be in the range from 10 to 30% of the maximum width b of the bead core 5 in the tire axial direction because the length of 10% or more helps reduce the effect on the end portion 9 of the ply turn-up portion 6b even when the reactive force from the rim flange deforms rubber used in the bead portion. On the other hand, the length of 30% or less helps mitigate large differences in rigidity and also reduces strain in the end portion 9 by preventing the end portion 9 from being located too close to the ply main body 6a.

Figure 7:
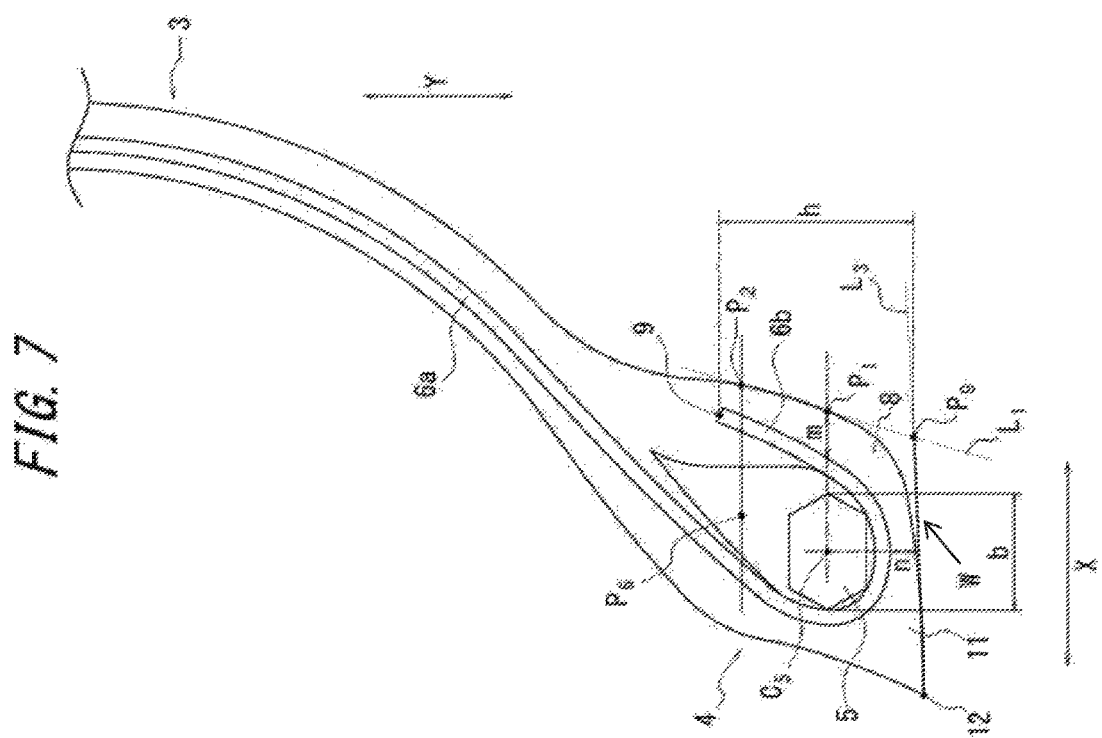
FIG. 7 is yet another enlarged view of the bead portion and the sidewall portion on the one side of the pneumatic tire illustrated in FIG. 1.

As illustrated in FIG. 7, it is also preferable that, in the non-rim assembled state, a rubber thickness m measured in the tire axial direction on a straight line passing the barycenter $C_5$ of the bead core 5 and drawn in parallel with the tire axial direction is in the range from 70 to 300% of a rubber thickness n measured in the tire radial direction on a straight line passing the barycenter $C_5$ of the bead core 5 and drawn in parallel with the tire radial direction.

By thus controlling the rubber thickness to be substantially uniform in the bead heel portion 8 around the bead core 5, the reactive force from the rim flange 20 is received evenly by the entire rubber in the vicinity of the bead heel portion 8 when the tire is assembled with a rim. As a result, local load concentration on the end portion 9 of the ply turn-up portion 6b is avoided, and load intensity on the end portion 9 is reduced, and the occurrence of the separation of the ply end is further prevented.

It is also preferable that, in the non-rim assembled state, a bead base width W is in the range from 200 to 260% of the maximum width b of the bead core 5 in the tire axial direction.

Herein, the bead base width W refers to a length between a bead toe 12 of the bead portion 4 and an intersection $P_9$ between a tangent line $L_3$ of the outer surface of the bead base portion and the outer surface straight line $L_1$ defined by the bead back face portion.

Setting the bead base width W to be the above length allows the bead base portion 11 to establish contact with a bead seat portion of the rim over a sufficient area when the tire is assembled with a rim. This ensures that the reactive force from the rim flange is absorbed by rubber used in the vicinity of the bead base portion. As a result, the effect on the end portion of the ply turn-up portion is reduced, and the occurrence of the separation of the ply end is further prevented. Accordingly, durability of the tire is further ensured.

Additionally, when the bead base width W is set to be less than 200% of the maximum width b of the bead core 5 in the tire axial direction, load intensity on the bead back face portion is increased, and the reactive force from the rim flange is increased. Accordingly, the effect on the end portion 9 is increased, resulting in an increase in strain in the end portion 9. On the other hand, when the bead base width W is set to be more than 260%, the weight of rubber used in the bead portion is increased in contrast to the original purpose of weight reduction, and moreover, the volume of the bead portion is increased, possibly resulting in an increase in the amount of heat generated.

It is also preferable that, in the non-rim assembled state, a distance h defined in the tire radial direction from the intersection $P_9$ between the outer-surface straight line $L_1$ defined by the bead back face portion and the tangent line $L_3$ of the outer surface of the bead base portion 11, to the end portion 9 of the ply turn-up portion 6b is in the range from 100 to 225% of the maximum width b of the bead core 5 in the tire axial direction. It is more preferable that the distance h is in the range from 135 to 200% of the maximum width b of the bead core 5 in the tire axial direction.

By thus adopting the structure that controls a height in which the ply turn-up height 6b is turned up to be relatively small, an amount of the carcass ply 6 used is reduced, and the weight of the tire is further reduced. Furthermore, thus adopting the structure that controls the height in which the ply turn-up height 6b is turned up to be relatively small, instead of the structure that winds up the turn-up portion over the bead core 5, also prevents an increase in manufacturing cost.

Figure 8:
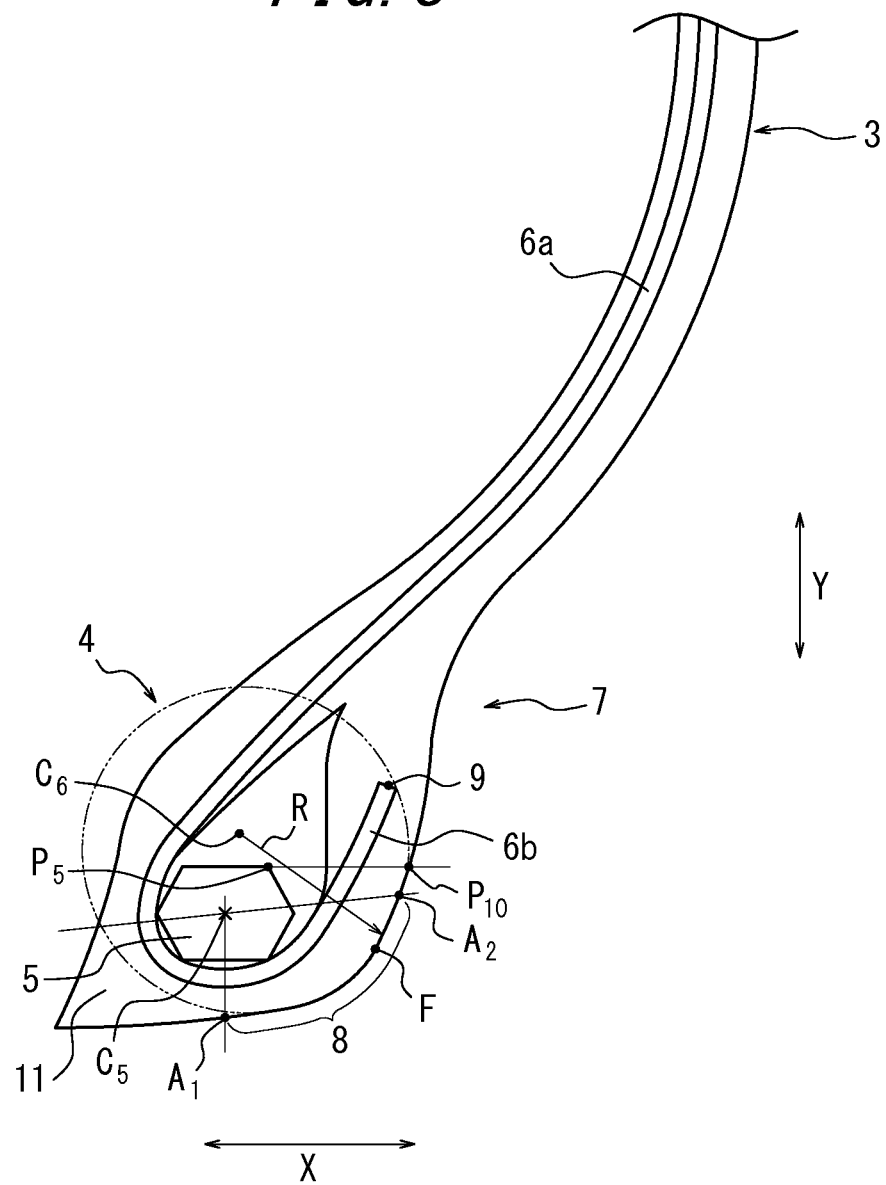
FIG. 8 is yet another enlarged view of the bead portion and the sidewall portion on the one side of the pneumatic tire illustrated in FIG. 1.

Furthermore, it is preferable that, in addition to the aforementioned structure, that the outer surface of the tire defined by the bead back face portion in a region between the bead heel portion 8 and an intersection $P_{10}$ is defined by at least one arc that has a the center of curvature $C_6$ located inward of the outer surface of the tire in the tire axial direction and that also has a radius of curvature R in the range from 10 to 80 mm in a state where a width between the pair of bead portions 4, 4 is set to be a nominal rim width in the sectional view of FIG. 8 that is taken along the tire axial direction. The intersection $P_{10}$ is defined as an intersection between a straight line passing the outermost end $P_5$ of the bead core 5 in the tire radial direction and extending in parallel with the tire axial direction X and the outer surface of the tire.

Herein, the state where the width between the pair of bead portions is set to be the nominal rim width means that a distance defined in the widthwise direction between the respective bead heels 8, 8 of the bead portions 4, 4 of the tire 1 is set to be a rim width (i.e., a rim width suitable for bringing out the performance of the tire) specified in the JATMA or the like, and the above dimension is measured in this state. Furthermore, the bead heel portion 8 refers to a portion of the outer surface of the tire in a region between an intersection $A_1$, which is an intersection between a line passing the center $C_5$ of the bead core 5 and extending in the tire radial direction and the outer surface of the tire, and an intersection $A_2$, which is an intersection between a line passing the center $C_5$ of the bead core 5 and extending in parallel with an outer contour of the bead base portion.

FIG. 3A illustrates the state of contact between the bead portion 4 and the rim flange 20 when the arc forming the outer surface of the tire defined by the bead back face portion has a radius of curvature R of 15 mm in the state where the pneumatic tire 1 according to the embodiment has been assembled with the prescribed rim and inflated at the normal maximum internal pressure with the specified load exerted thereon. On the other hand, FIG. 3B illustrates the state of contact between the bead portion 40 and the rim flange 200 when the arc forming the outer surface of the tire defined by the bead back face portion has a radius of curvature R of 140 mm in the state where the conventional pneumatic tire 101 has been assembled with the prescribed rim and inflated at the normal maximum internal pressure with the specified load exerted thereon.

As described earlier, although weight reduction of the tire may be achieved by forming the recessed portion in the side rubber in the region between the rim separating point and the tire maximum width position, rigidity of the bead portion is reduced because of the reduced thickness of the side rubber. Accordingly, when the tire is assembled with a rim, rubber used in the bead portion tends to be deformed as the tire is pressed against the rim and receives the reactive force from the rim flange.

Firstly, in the conventional pneumatic tire 101 as illustrated in FIG. 3B in the state where the tire has been assembled with the rim, the contact zone $S_2$ (corresponding to the hatched zone) between the bead portion 40 and the rim flange 200 extends from a bead toe 120 to the vicinity of the rim flange end 200a. Furthermore, the outer surface of the tire defined by the bead back face portion has a relatively large radius of curvature, and accordingly, portions of the outer surface of the tire that are located in the vicinity of, in particular, the rim separating point F and the bead toe 120 of the bead portion 40 are in tight contact with the rim flange 200 when the tire is assembled with a rim. That is to say, a contact pressure between the outer surface of the tire in the bead portion 40 and the rim flange 200 within the contact zone $S_2$ is high in particular in the vicinity of the rim separating point F and the bead toe 120, and the contact pressure in the vicinity of the bead heel portion 80 is low.

In this way, since the end portion 90 of the ply turn-up portion 60b is located close to the rim separating point F with the high contact pressure, the end portion 90 is subject to the effect of the reactive force from the rim flange 200. Accordingly, when the bead portion 40 is deformed, the end portion 90 might be strained, leading to the occurrence of the separation of the ply end.

On the other hand, in the pneumatic tire 1 according to the present embodiment as illustrated in FIG. 3A, the radius of curvature R of the outer surface of the tire defined by the bead back face portion is smaller than in the conventional pneumatic tire 101. This allows the contact zone $S_1$ (corresponding to the hatched zone) between the bead portion 4 and the rim flange 20 to be located further inward in the tire radial direction, i.e., closer to the bead heel 8, than the conventional contact zone $S_2$. In other words, the rim separating point F is located further inward in the tire radial direction compared with the conventional pneumatic tire. Furthermore, the radius of curvature R is relatively small, and accordingly, the outer surface of the tire fits the flexed shape of the end portion of the bead seat in the rim flange 20, and fit property with respect to the rim flange is improved when the tire is assembled with a rim. Accordingly, the contact pressure between the outer surface of the tire in the bead portion 4 that is located within the contact zone $S_1$ and the rim flange 20 is substantially uniform within the contact zone $S_1$. This allows the end portion 9 of the ply turn-up portion 6b to be located far from the contact zone $S_1$, and moreover, because of the dispersed contact pressure within the contact zone $S_1$, unlike the conventional pneumatic tire, the contact pressure cannot be increased particularly in the rim separating point F located closest to the end portion 9. As a result, the effect caused by the reactive force from the rim flange 20 on the end portion 9 is remarkably reduced compared with the conventional pneumatic tire, resulting in a pneumatic tire with excellent durability that will not suffer from the occurrence of the separation of the ply end.

Additionally, the radius of curvature R is set to be in the range from 10 to 80 mm because the radius of curvature of less than 10 mm will result in an extremely small radius, a locally increased contact pressure, and failure to evenly disperse the contact pressure. On the other hand, the radius of curvature R of more than 80 mm will result in a decrease in the rising angle of the outer surface defined by the bead back face portion from the bead heel portion 8 toward the tire radial direction, leading to difficulty in isolating the end portion 9 of the turn-up portion 6b from the rim releasing point F sufficiently. The radius of curvature R is more preferably in the range from 15 to 70 mm.

EXAMPLES

Next, to verify the advantageous effects of the embodiments, tires of Examples according to the present disclosure and tires of Comparative Examples were prepared, and separation resistance in the respective end portions of the ply turn-up portions in the carcasses was evaluated by comparison of durability in the bead portions of the tires.

The tire of Example 1 is a pneumatic tire having a tire size of 275/80R22.5, a recessed portion formed in each region defined between the rim separating point and the tire maximum width position, and an angle α, in the outer surface of the tire defined by each bead back face portion, of 70° as illustrated in FIG. 1, and specifications shown in Table 1.

The tires of Examples 2 to 14 have structures similar to that of the tire of Example 1 but differ from the tire of Example 1 in that the respective values of specifications are changed as shown in Table 1.

The tire of Comparative Example 1 has a structure similar to that of the tire of Example 1 but differs from the tire of Example 1 in that the angle α of the outer surface of the tire defined by the bead back face portion is 60°.

The tire of Comparative Example 2 also has a structure similar to that of the tire of Example 1 but differs from the tire of Example 1 in that the angle α of the outer surface of the tire defined by the bead back face portion is 110°.

In detail, separation resistance of each test tire was evaluated by assembling the tire with a prescribed rim, and inflating the tire thus assembled at an internal pressure of 875 kPa, subjecting the tire thus assembled and inflated to a drum test with a load (3395 kgf) corresponding the maximum load capacity (specified load) specified by the JATMA being exerted as an initial load and at the test speed of 60 km/h, and measuring a running distance on the drum travelled by the tire until the test was unavoidably interrupted due to excessive vibration caused by separation occurring in the carcass ply. Measurement results of thus obtained distances are shown in Table 1. These results are shown with indices based on the travelling distance of the tire of Comparative Example 1 being 100. Larger values represent better separation resistance.

The amount of reduction (kg) in weight of the tire shown in Table 1 represents an amount of reduction (in rubber weight (kg)) compared with a tire not including a recessed portion as the standard.

TABLE 1

| | Example 1 | Example 2 | Example 3 | Example 4 | Example 5 | Example 6 | Example 7 | Example 8 |
|---|---|---|---|---|---|---|---|---|
| Angle α that outer-surface straight line defined by bead back face portion forms with respect to tire axial direction (°) | 70 | 80 | 90 | 100 | 80 | 80 | 80 | 80 |
| Angle β that the line defined by ply turn-up protion forms with respect to tire axial direction (°) | 80 | Same as Example 1 | Same as Example 1 | Same as Example 1 | 60 | 110 | Same as Example 1 | Same as Example 1 |
| Maximum length $t_{max}$ of clearance distance | 0.15b | Same as Example 1 | Same as Example 1 | Same as Example 1 | Same as Example 1 | Same as Example 1 | 0.05b | 0.4b |
| Rubber thickness m/rubber thickness n | 1 | Same as Example 1 | Same as Example 1 | Same as Example 1 | Same as Example 1 | Same as Example 1 | Same as Example 1 | Same as Example 1 |
| Bead base width W/maximum width b of bead core in tire axial direction | 2.3 | Same as Example 1 | Same as Example 1 | Same as Example 1 | Same as Example 1 | Same as Example 1 | Same as Example 1 | Same as Example 1 |
| Distance h defined in tire radial direction of ply turn-up portion/maximum width b of bead core in tire axial direction | 1.65 | Same as Example 1 | Same as Example 1 | Same as Example 1 | Same as Example 1 | Same as Example 1 | Same as Example 1 | Same as Example 1 |
| Amount of reduction in weight of tire (kg) | 1.5 | 2.5 | 3 | 3.5 | 2.5 | 2.5 | 2 | 3.5 |
| Separation resistance performance | 110 | 117 | 110 | 103 | 99 | 90 | 98 | 97 |

TABLE 1-continued (index)

|  | Example 9 | Example 10 | Example 11 | Example 12 | Example 13 | Example 14 | Comparative Example 1 | Comparative Example 2 |
|---|---|---|---|---|---|---|---|---|
| Angle α that outer-surface straight line defined by bead back face portion forms with respect to tire axial direction (°) | 80 | 80 | 80 | 80 | 80 | 80 | 55 | 110 |
| Angle β that the line defined by ply turn-up protion forms with respect to tire axial direction (°) | Same as Example 1 | Same as Example 1 | Same as Example 1 | Same as Example 1 | Same as Example 1 | Same as Example 1 | Same as Example 1 | Same as Example 1 |
| Maximum length $t_{max}$ of clearance distance | Same as Example 1 | Same as Example 1 | Same as Example 1 | Same as Example 1 | Same as Example 1 | Same as Example 1 | Same as Example 1 | Same as Example 1 |
| Rubber thickness m/rubber thickness n | 0.5 | Same as Example 1 | Same as Example 1 | Same as Example 1 | Same as Example 1 | Same as Example 1 | Same as Example 1 | Same as Example 1 |
| Bead base width W/maximum width b of bead core in tire axial direction | Same as Example 1 | 1.5 | 3 | Same as Example 1 | Same as Example 1 | Same as Example 1 | Same as Example 1 | Same as Example 1 |
| Distance h defined in tire radial direction of ply turn-up portion/maximum width b of bead core in tire axial direction | Same as Example 1 | Same as Example 1 | Same as Example 1 | 2 | 0.8 | 2.4 | Same as Example 1 | Same as Example 1 |
| Amount of reduction in weight of tire (kg) | 3 | 3.5 | 1.5 | 3.3 | 3 | 2 | 0 | 4 |
| Separation resistance performance (index) | 98 | 98 | 97 | 102 | 90 | 91 | 100 | 96 |

It has been found from the results shown in Table 1 that the tires of Examples, with the recessed portions, allow weight reduction and that tires of Examples exhibit improved separation resistance and maintain highly satisfactory durability compared with the tire of Comparative Example 1.

It has been also confirmed that the tires of Examples exhibit reduced degradation and damage compared with the tire of Comparative Example 2 with the ply end portion that is located too close to the outer surface.

The tire of Reference Example 1 is a pneumatic tire having a tire size of 275/80R22.5 and the outer surface of the tire defined by each bead back face portion with a radius of curvature R of 15 mm as illustrated in FIG. 2, and specifications shown in Table 1. The tires of Reference Examples 2 to 16 have structures similar to that of the tire of Reference Example 1 but differ from the tire of Reference Example 1 in that the respective specifications are changed as shown in Table 1. The tire of Comparative Reference Example 1 has a structure similar to that of the tire of Reference Example 1 but differs from the tire of Reference Example 1 in that the radius of curvature R of the outer surface of the tire defined by the bead back face portion is 140 mm. The tire of Comparative Reference Example 2 has a structure similar to that of the tire of Reference Example 1 but differs from the tire of Reference Example 1 in that the radius of curvature R of the outer surface of the tire defined by the bead back face portion is 5 mm.

Separation resistance was evaluated similarly to the Examples described above. Results are shown in Table 2 with indices based on the travelling distance of the tire of Comparative Reference Example 1 being 100. The amount of reduction in weight of each tire was also evaluated similarly to the Examples described above.

TABLE 2

|  | Reference Example 1 | Reference Example 2 | Reference Example 3 | Reference Example 4 | Reference Example 5 | Reference Example 6 |
|---|---|---|---|---|---|---|
| Radius of curvature R(mm) | 10 | 15 | 70 | 80 | Same as Reference Example 2 | Same as Reference Example 2 |
| Angle α that outer-surface straight line defined by bead back face portion forms with respect to tire axial direction (°) | Same as Reference Example 2 | 80 | Same as Reference Example 2 | Same as Reference Example 2 | 65 | 105 |
| Angle β that the line defined by ply turn-up portion forms with respect to tire axial direction (°) | Same as Reference Example 2 | 80 | Same as Reference Example 2 | Same as Reference Example 2 | Same as Reference Example 2 | Same as Reference Example 2 |
| Maximum length $t_{max}$ of clearance distance | Same as Reference Example 2 | 0.15b | Same as Reference Example 2 | Same as Reference Example 2 | Same as Reference Example 2 | Same as Reference Example 2 |
| Rubber thickness m/rubber thickness n | Same as Reference Example 2 | 1 | Same as Reference Example 2 | Same as Reference Example 2 | Same as Reference Example 2 | Same as Reference Example 2 |
| Bead base width W/maximum width b of bead core in tire axial direction | Same as Reference Example 2 | 2.3 | Same as Reference Example 2 | Same as Reference Example 2 | Same as Reference Example 2 | Same as Reference Example 2 |
| Distance h defined in tire radial direction of ply turn-up portion/maximum width b of bead core in tire axial direction | Same as Reference Example 2 | 1.65 | Same as Reference Example 2 | Same as Reference Example 2 | Same as Reference Example 2 | Same as Reference Example 2 |
| Amount of reduction in weight of tire (kg) | 2.4 | 2.5 | 2.7 | 2.8 | 2 | 3.5 |
| Separation resistance performance (index) | 99 | 117 | 105 | 103 | 99 | 99 |

TABLE 2-continued

|  | Reference Example 7 | Reference Example 8 | Reference Example 9 | Reference Example 10 | Reference Example 11 | Reference Example 12 |
|---|---|---|---|---|---|---|
| Radius of curvature R(mm) | Same as Reference Example 2 | Same as Reference Example 2 | Same as Reference Example 2 | Same as Reference Example 2 | Same as Reference Example 2 | Same as Reference Example 2 |
| Angle α that outer-surface straight line defined by bead back face portion forms with respect to tire axial direction (°) | Same as Reference Example 2 | Same as Reference Example 2 | Same as Reference Example 2 | Same as Reference Example 2 | Same as Reference Example 2 | Same as Reference Example 2 |
| Angle β that the line defined by ply turn-up portion forms with respect to tire axial direction (°) | 60 | 110 | Same as Reference Example 2 | Same as Reference Example 2 | Same as Reference Example 2 | Same as Reference Example 2 |
| Maximum length $t_{max}$ of clearance distance | Same as Reference Example 2 | Same as Reference Example 2 | 0.05b | 0.4b | Same as Reference Example 2 | Same as Reference Example 2 |
| Rubber thickness m/rubber thickness n | Same as Reference Example 2 | Same as Reference Example 2 | Same as Reference Example 2 | Same as Reference Example 2 | 0.5 | Same as Reference Example 2 |
| Bead base width W/maximum width b of bead core in tire axial direction | Same as Reference Example 2 | Same as Reference Example 2 | Same as Reference Example 2 | Same as Reference Example 2 | Same as Reference Example 2 | 1.5 |
| Distance h defined in tire radial direction of ply turn-up portion/maximum width b of bead core in tire axial direction | Same as Reference Example 2 | Same as Reference Example 2 | Same as Reference Example 2 | Same as Reference Example 2 | Same as Reference Example 2 | Same as Reference Example 2 |
| Amount of reduction in weight of tire (kg) | 2.5 | 2.5 | 2 | 3.5 | 3 | 3.5 |
| Separation resistance performance (index) | 99 | 90 | 98 | 97 | 98 | 98 |

|  | Reference Example 13 | Reference Example 14 | Reference Example 15 | Reference Example 16 | Comparative Reference Example 1 | Comparative Reference Example 2 |
|---|---|---|---|---|---|---|
| Radius of curvature R(mm) | Same as Reference Example 2 | Same as Reference Example 2 | Same as Reference Example 2 | Same as Reference Example 2 | 140 | 5 |
| Angle α that outer-surface straight line defined by bead back face portion forms with respect to tire axial direction (°) | Same as Reference Example 2 | Same as Reference Example 2 | Same as Reference Example 2 | Same as Reference Example 2 | 55 | 110 |
| Angle β that the line defined by ply turn-up portion forms with respect to tire axial direction (°) | Same as Reference Example 2 | Same as Reference Example 2 | Same as Reference Example 2 | Same as Reference Example 2 | Same as Reference Example 2 | Same as Reference Example 2 |
| Maximum length $t_{max}$ of clearance distance | Same as Reference Example 2 | Same as Reference Example 2 | Same as Reference Example 2 | Same as Reference Example 2 | Same as Reference Example 2 | Same as Reference Example 2 |
| Rubber thickness m/rubber thickness n | Same as Reference Example 2 | Same as Reference Example 2 | Same as Reference Example 2 | Same as Reference Example 2 | Same as Reference Example 2 | Same as Reference Example 2 |
| Bead base width W/maximum width b of bead core in tire axial direction | 3 | Same as Reference Example 2 | Same as Reference Example 2 | Same as Reference Example 2 | Same as Reference Example 2 | Same as Reference Example 2 |
| Distance h defined in tire radial direction of ply turn-up portion/maximum width b of bead core in tire axial direction | Same as Reference Example 2 | 2 | 0.8 | 2.4 | Same as Reference Example 2 | Same as Reference Example 2 |
| Amount of reduction in weight of tire (kg) | 1.5 | 2.3 | 3 | 2 | 0 | 4 |
| Separation resistance performance (index) | 97 | 102 | 90 | 91 | 100 | 86 |

It has been found from the results shown in Table 2 that the tire of Reference Examples, with the recessed portions, allow weight reduction and that tires of Reference Examples exhibit improved separation resistance and maintain highly satisfactory durability compared with the tire of Comparative Reference Example 1. It has been also confirmed that the tire of Comparative Reference Example 2 faces the problem of a locally increased contact pressure and failure to evenly disperse the contact pressure, which causes separation in the back face of the tire, compared with the tires of Reference Examples.

INDUSTRIAL APPLICABILITY

According to the present disclosure, a pneumatic tire having reduced weight and simultaneously ensuring excellent durability is provided.

REFERENCE SIGNS LIST

1 pneumatic tire
2 tread portion
3 sidewall portion
4 bead portion
5 bead core
6 carcass 6a ply main body
6b ply turn-up portion
7 recessed portion
8 bead heel portion
9 end portion of ply turn-up portion 6b
11 bead base portion
12 bead toe
20 rim flange
$A_1$ intersection between a line passing center $C_5$ of bead core 5 and extending in tire radial direction, and outer surface of tire
$A_2$ intersection between a line passing center $C_5$ of bead core 5 and extending in parallel with outer contour of bead base portion 11, and outer surface of tire
F rim separating point
$C_1$, $C_2$, $C_3$ center of curvature
$C_5$ barycenter of bead core 5
$C_6$ center of curvature of outer surface of tire defined by bead back face portion
H tire section height
$L_1$ outer surface straight line defined by bead back face portion
$L_2$ tilt line defined by ply turn-up portion
$L_3$ tangent line of outer surface of bead base portion 11
$P_1$ first intersection
$P_2$ second intersection
$P_3$ tire maximum width position
$P_5$ outermost end of bead core 5 in tire radial direction
$P_6$ point located outward in tire radial direction at distance of 50% of maximum width a of bead core 5 in tire radial direction from outermost end $P_5$ of bead core 5 in tire radial direction
$P_7$ third intersection
$P_8$ fourth intersection
$P_9$ intersection between tangent line $L_3$ of outer surface of bead base portion and outer surface straight line $L_1$ defined by bead back face portion
$P_{10}$ intersection between straight line passing outermost end $P_5$ of bead core 5 in tire radial direction and extending in parallel with tire axial direction, and outer surface of tire
W bead base width
X tire axial direction
Y tire radial direction
a maximum width of bead core 5 in tire radial direction
b maximum width of bead core 5 in tire axial direction
d rubber thickness
h distance defined in tire radial direction from intersection $P_9$ to end portion 9
m rubber thickness measured in tire axial direction on straight line passing barycenter of bead core and drawn in parallel with tire axial direction
n rubber thickness measured in tire radial direction on straight line passing barycenter of bead core and drawn in parallel with tire radial direction
t clearance distance
$t_{max}$ maximum length of clearance distance
α angle that outer-surface straight line $L_1$ defined by bead back face portion forms with respect to tire axial direction X
β angle that tilt line $L_2$ defined by ply turn-up portion forms with respect to tire axial direction X

The invention claimed is:
1. A pneumatic tire, comprising:
a tread portion, a pair of sidewall portions, and a pair of bead portions formed to be continuous with each other, each bead portion including a bead base portion;
a carcass constituted of at least one ply including a ply main body provided to extend in a toroidal shape across a pair of bead cores respectively embedded in the bead portions and respective ply turn-up portions each extending from the ply main body to be turned up around a corresponding bead core from an inner side toward an outer side in a tire axial direction; and
a recessed portion formed to be recessed inward in the tire axial direction at an outer surface of the tire in a region between a rim separating point and a tire maximum width position in each sidewall portion, wherein:
in a section taken along the tire axial direction in a non-rim assembled state where the tire has not been assembled with a rim, and where a width between the pair of bead portions is set to be a nominal rim width, an angle a is defined as an angle that an outer-surface straight line, defined by a bead back face portion and passing a first intersection and a second intersection, forms with respect to the tire axial direction;
the first intersection being defined as an intersection between a straight line passing a barycenter of the bead core and extending in parallel with the tire axial direction, and the outer surface of the tire;
the second intersection being defined as an intersection between a straight line passing a point located outward in a tire radial direction at a distance of 50% of a maximum width of the bead core in the tire radial direction from an outermost end of the bead core in the tire radial direction and extending in parallel with the tire axial direction, and the outer surface of the tire;
the angle a being in a range from 70 to 100°, and
in the non-rim assembled state, the distance defined in the tire radial direction from the intersection between: the outer-surface straight line defined by the bead back face portion and a tangent line of the bead base portion of the bead portion, to an end portion of the ply turn-up portion, is in a range from 135 to 200% of the maximum width of the bead core in the tire axial direction,
a rubber thickness of the tire gradually decreases in a first portion of the tire towards an outer side in the tire radial direction between the rim separating point and a point on the tire surface corresponding to the end portion of the ply turn-up portion,
a third intersection being defined as an intersection between a straight line passing a barycenter of the bead core and extending in parallel with the tire axial direction, and the ply turn-up portion,
a fourth intersection being defined as an intersection between a straight line passing a point located outward in a tire radial direction at a distance of 50% of a maximum width of the bead core in the tire radial direction from an outermost end of the bead core in the tire radial direction and extending in parallel with the tire axial direction, and the ply turn-up portion,
wherein a contour of the recessed portion and a tilt line passing through the third intersection and the fourth intersection intersect each other.

2. The pneumatic tire of claim 1, wherein, in the non-rim assembled state, the outer surface of the tire in a region between a bead heel portion and the tire maximum width position is defined by:
at least one arc having a center of curvature that is located inward of the outer surface of the tire in the tire axial direction,
at least one arc having a center of curvature that is located outward of the outer surface of the tire in the tire axial direction, and at least one arc having a center of curvature that is located inward of the outer surface of the tire in the tire axial direction, in this stated order in a direction toward an outer side in the tire radial direction.

3. The pneumatic tire of claim 1, wherein the rubber thickness of the tire is constant in a second portion of the tire that follows the first portion in the tire radial direction, and wherein, in the non-rim assembled state, the second portion extends outward in the tire radial direction to one-half a tire section height in the tire radial direction.

4. The pneumatic tire of claim 1, wherein, in the non-rim assembled state, an angle b is defined as an angle that the tilt line, defined by a ply turn-up portion, passing the third intersection and the fourth intersection forms with respect to the tire axial direction, the angle b being in the range from 70 to 100°.

5. The pneumatic tire of claim 1, wherein, in a rim assembled state where the tire has been assembled with a prescribed rim and inflated at a normal maximum internal pressure with no load exerted thereon, a clearance distance defined in the tire axial direction between the outer surface of the tire and a rim flange gradually increases toward an outer side in the tire radial direction, and a maximum length of the clearance distance is in the range from 10 to 30% of a maximum width of the bead core in the tire axial direction.

6. The pneumatic tire of claim 1, wherein, in the non-rim assembled state, a rubber thickness measured in the tire axial direction on a straight line passing the barycenter of the bead core and drawn in parallel with the tire axial direction is in the range from 70 to 300% of a rubber thickness measured in the tire radial direction on a straight line passing the barycenter of the bead core and drawn in parallel with the tire radial direction.

7. The pneumatic tire of claim 1, wherein, in the non-rim assembled state, a bead base width of the bead portion is in the range from 200 to 260% of a maximum width of the bead core in the tire axial direction.

8. The pneumatic tire of claim 1, wherein, in the non-rim assembled state, a rubber thickness of the tire gradually decreases toward the outer side in the tire radial direction in a first portion of the tire defined in the tire radial direction, and including the recessed portion, the recessed portion overlaps at least a part of the first portion where the rubber thickness gradually decreases,
the rubber thickness of the tire is constant in a second portion of the tire that consecutively follows the first portion in the tire radial direction.

9. The pneumatic tire of claim 1, wherein a center of curvature of the recessed portion is located on an outer side in the tire radial direction with respect to an end portion of each ply turn-up portion.

* * * * *